United States Patent [19]

Min

[11] Patent Number: 4,560,913
[45] Date of Patent: Dec. 24, 1985

[54] SPARKLESS CIRCUIT FOR LOW HORSEPOWER ELECTRONIC MOTOR BRAKE

[75] Inventor: Young K. Min, Milwaukee County, Wis.

[73] Assignee: PT Components, Inc., Indianapolis, Ind.

[21] Appl. No.: 556,288

[22] Filed: Nov. 30, 1983

[51] Int. Cl.[4] .............................................. H02P 3/24
[52] U.S. Cl. .................................... 318/760; 318/759
[58] Field of Search ............................... 318/759–762

[56] References Cited

U.S. PATENT DOCUMENTS

| | | | |
|---|---|---|---|
| 3,581,168 | 5/1971 | Kirkby | 318/759 |
| 3,590,351 | 6/1971 | Littwin | 318/759 |
| 3,897,595 | 7/1973 | Fearno | 318/762 |
| 3,913,001 | 10/1975 | Kayama | 363/24 |
| 4,305,030 | 12/1981 | Lorenz | 318/759 |
| 4,340,131 | 7/1982 | Eriksson | 318/758 |
| 4,392,098 | 7/1983 | Min | 318/759 |

FOREIGN PATENT DOCUMENTS

| | | | |
|---|---|---|---|
| 58813 | 5/1977 | Japan | 318/762 |
| 160986 | 12/1980 | Japan | 318/762 |

Primary Examiner—David Smith, Jr.
Attorney, Agent, or Firm—Robert A. Brown

[57] ABSTRACT

A control circuit for connecting and disconnecting an electronic motor brake with an AC motor and a source of AC power over electromechanical relay contacts wherein opto-coupled circuits operatively control energization and de-energization of a braking circuit with minimal time delay and provide operational response of the relay contacts in a substantially sparkless manner to promote contact life.

9 Claims, 1 Drawing Figure

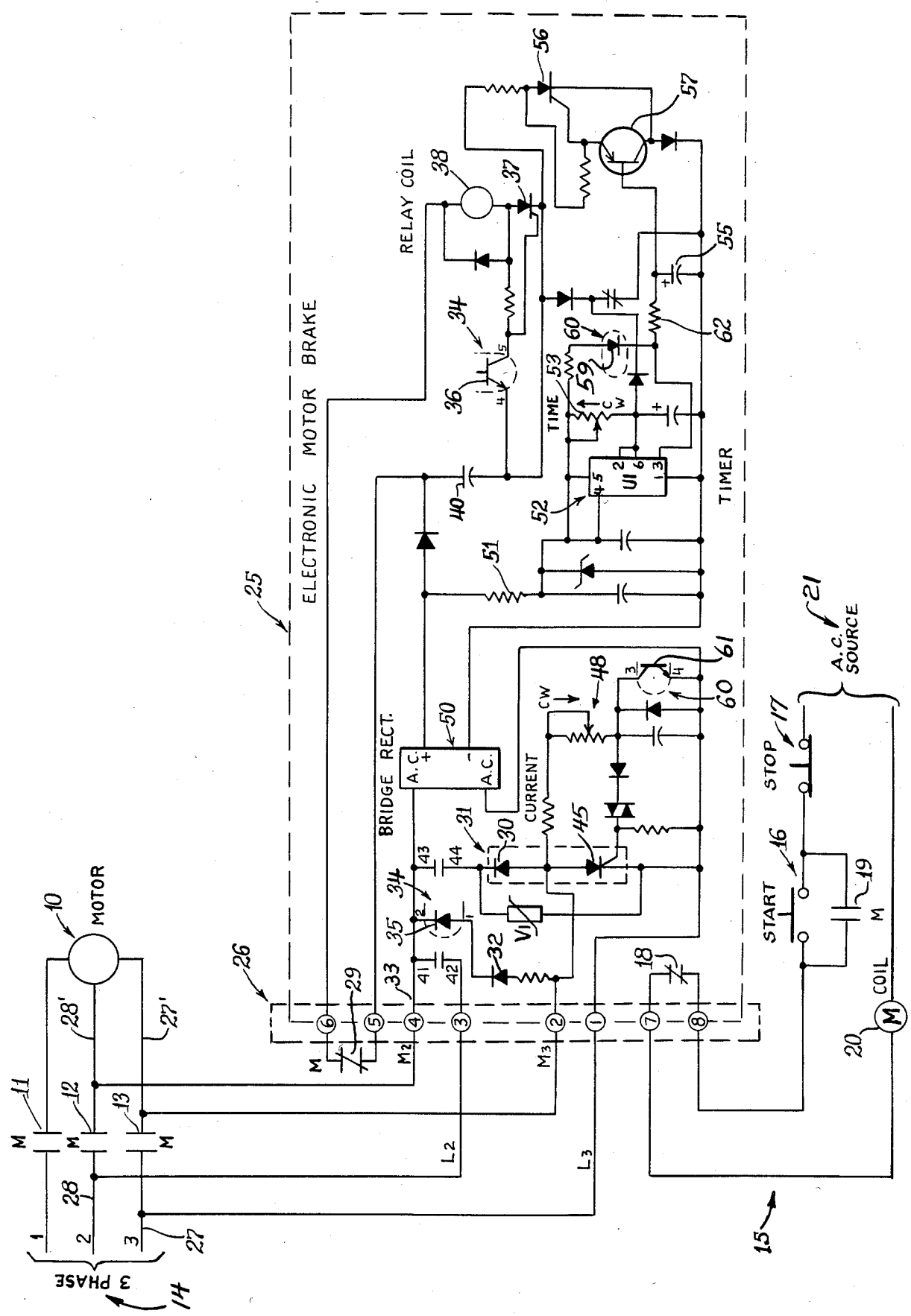

SPARKLESS CIRCUIT FOR LOW HORSEPOWER ELECTRONIC MOTOR BRAKE

BACKGROUND OF THE INVENTION

This invention relates generally to dynamic braking of electrical motors and more specifically to an improved control circuit means for connecting and disconnecting an electronic motor brake circuit with low horsepower motors and an AC power source.

Dynamic motor braking concerns the electrical principle by which direct current applied to the stator of an alternating current induction motor causes a decelerating action on the rotor. Dynamic rotor brake circuits usually provide a source of direct current used in the braking action, a switching circuit for connecting and disconnecting the DC power source and timing means for regulating the length of time braking action is applied. In general, electronic motor brake circuits are connected to an AC power source over electromechanically operated relay contacts which are subject to corrosion and excessive sparking and wear. It is desirable therefore to provide means for the sparkless connection and disconnection of the brake circuit contactors. In the past, various control schemes for electronic braking circuitry have incorporated solid state controlled rectifiers in circuit with the relay for minimizing contact sparking. However, such prior known applications have related primarily to high horsepower electronic motor blade circuits. Because of high costs, useful means for effecting sparkless connection and disconnection of motor brake circuits to promote extended relay contact, have not been successful in low horsepower motor applications. It is to this area that the present invention is directed.

SUMMARY OF THE INVENTION

The present invention relates to an electronic motor braking circuit for supplying current braking energy to the stator of an AC motor, particularly of low horsepower, in which the braking circuit is connected to and disconnected from a source of AC power over electrochemical relay contacts. Control circuit means are provided for effecting substantially sparkless operation of the relay contacts comprising an opto-coupled SCR in circuit with an operating coil of the relay. This control means is energized by alternating current generated by the motor while coasting after being disconnected from its normal AC power supply. Selected response of the opto-coupler prevents energization of the relay coil during a plus energy cycle of the motor generated AC. During the following minus energy cycle of motor generated current, the opto-coupler turns "off" permitting the relay coil to be momentarily energized by means of a capacitor thereby closing the relay contacts and connecting the relay coil and motor brake circuit to the motor's normal AC power supply. However, the latter takes place only after the relay contacts are fully closed and while the brake circuit is in a de-energized state thereby avoiding relay contact sparking. A timing circuit is incorporated in the electronic motor brake circuit for regulating the period during which braking energy is applied to the motor. When the timer circuit reaches the end of its preset cycle, a second opto-coupler turns on, shorting the gate of an SCR which controls the DC output of the brake circuit. This turns the SCR off, de-energizing the brake circuit and stopping the braking effect on the motor. Thereafter, the gate of a relay controlling SCR is shorted to de-energize the relay coil and cause its contacts to oepn with minimum sparking.

It is a principal object of this invention to provide an improved control circuit for an electronic motor brake for use with low horsepower AC motors.

Another important object of this invention is to provide a cost effective and economical means for the sparkless connection and disconnection of an electronic motor brake circuit with a source of AC power.

Still another object of this invention is to provide control circuit means for use with electronic motor brake circuitry employed in the dyanmic braking of low horsepower AC motors and the like which comprises opto-coupling means for effecting sparkless connection and disconnection of the brake circuit with the motor and a source of AC power.

Having described this invention, the above and further objects, features and advantages thereof will appear from time to time from the following detailed description of a preferred embodiment thereof, illustrated in the accompanying drawing, and teaching the best mode presently contemplated for enabling those of skill in this art to make and practice this invention.

DESCRIPTION OF THE DRAWING

The single FIGURE is a schematic diagram of an improved electronic motor brake and control circuit means in accordance with this invention.

DESCRIPTION OF THE PREFERRED EMBODIMENT

Referring to the drawing FIGURE, it will be recognized that an AC induction motor 10 is supplied with AC power through contacts 11, 12 and 13 of a motor contactor M in circuit with a three-phase AC power supply 14. The motor contacts 11–13 are controlled by a typical 3 wire motor control circuit means, indicated generally at 15, and comprising start/stop switch means 16 and 17, respectively, and a holding contact 19 of contactor M. When the momentarily engageable push button start switch 16 is depressed, the motor contactor, M, picks up and the closure of contact 19 bypasses the start switch to keep the contactor M energized when the push button start switch 16 is released. The motor control circuit 15 also includes normally closed contacts 18 of a relay 38. Circuit means 15 is powered from a suitable AC power source 21 and operates in a conventional fashion to energize a coil 20 when the start switch is closed, closing motor contacts 11, 12, 13 and 19 and thereby placing motor 10 in circuit with its main power supply 14.

An electronic motor brake module 25 is provided in accordance with this invention, comprising an eight-position terminal block 26 of which terminals 1 and 3 are connected by conductors L2 and L3 to AC power supply conductors 28 and 27, respectively, on the source side of the motor contacts 12 and 13. Terminals 2 and 4 of terminal block 26 are coupled by conductors M2 and M3 to conductors 28' and 27' on the motor (load) side of contacts 12 and 3. Terminals 5 and 6 are bridged by a normally closed set of contacts 29 of motor contactor M. When start switch 16 is activated and motor 10 is in an operative or run condition, the normally closed contacts of contactor M are caused to open and remain in that condition while the motor is energized. Terminals 7 and 8 are joined to the motor control circuit means 15 and the normally closed relay contacts 18 of relay 38.

The electronic motor brake module 25 is an assembly of components mounted on a printed circuit board and encased in a suitable enclosure capable of access for adjustments and electrical connection as need be. As mentioned previously, the basic function of the motor brake is to provide direct current to the stator of the motor 10 for decelerating the latter by recognized dynamic braking action. Module 25 also includes suitable control circuitry for connecting and disconnecting the DC braking energy to and from the motor 10, suitable timing means for regulating the length of braking action and improved means for the sparkless connection and disconnection of the motor brake with the motor's main AC power supply 14.

When the motor control stop switch 17 is depressed or "opened", the motor contactor coil 20 is de-energized, opening the several motor contacts 11, 12, 13 and 19, and causing the normally closed contacts 29 to return to their normally closed condition. This completely isolates the motor 10 from the three-phase AC source supply 14 and current to the motor 10 stops flowing. Although disconnected, the rotor of the motor 10 continues to rotate due to the load inertia, generating AC voltages of substantially the same frequency and phase as that provided by supply 14 so that for a short period of time, the motor continues to operate as if it were still coupled to its three-phase AC supply source.

The alternating current generated by the coasting motor is made up of both positive and negative cycles. It has been discovered that the positive cycle, measured with respect to the cathode of a diode 30 in a SCR/diode module 31 of the brake circuit, and the motor brake terminal 2 of terminal block 26 is the ideal time for connecting the brake circuit with the motor. To that end, a first control circuit comprises a diode 32 in circuit between terminal 2 and a conductor 33 joined to terminal 4 of the terminal block 26. This diode serves to prevent minus to plus current flow between terminal 2 and conductor 33 while permitting plus to minus flows therebetween.

The positive current flow serves to energize a first half of an opto-coupler 34 and more particularly a diode 35 thereof which is in series with the diode 32 and terminal 2. This optically signals the second half of the opto-coupler 34, to turn "on" a transistor 36, which is in the gate circuit of a relay controlling SCR 37. When transistor 36 of the opto-coupler 34 conducts, the gate of SCR 37 is shorted. This action occurs only during the one-half cycle of motor generated energy during which the diode 35 of the opto-coupler 34 is "on", i.e., terminal 2 of terminal block 26 is plus and terminal 4 is minus. Under these conditions, the coil of relay 38 in series with the SCR 37 remains in a de-energized condition.

A second control circuit containing normally closed contacts 29 of the contactor M are coupled to brake terminals 5 and 6. These contacts are normally closed, whenever the motor contactor coil 20 is de-energized. When this occurs, a capacitor 40, which was charged during motor "on" time, now discharges, turning the SCR 37 "on" to energize the relay coil 38. This event takes place when the motor generated voltage produces a minus to plus polarity condition between terminals 2 and 4 at which time the diode 35 of the opto-coupler 34 is "off". As a result of the discharge of the capacitor 40 to energize the relay coil 38, the main power supply 14 connects the electronic motor brake over line conductors L2, L3 and to terminal block 26 terminals 1 and 3 by closing contacts 41–42 and 43–44 of the relay 38. However, when this event happens, the diode 30 of the SCR/diode unit 31 is in a reversed bias condition, preventing current flow to the brake circuit until after the relay contacts 41–44 are fully closed, thereby minimizing sparking at such contacts.

Once current flows through the diode 30, a SCR 45 of unit module 31 is turned on to provide DC current to the stator of motor 10 in circuit with the motor conductor 27' through conductor M3 to terminal 2 of the connector block 26. Control of the DC output current of the SCR 45 is regulated by adjusting a variable resistance 48 in circuit therewith.

In addition to energizing the SCR/diode unit module 31, the AC line current supplied over conductors L2 and L3 also energizes a full wave bridge rectifier 50, permitting current to flow through a resistor 51 to activate a preset timer unit indicated generally at 52. The length of the braking time cycle is selected by adjusting a variably timed control resistor 53 of the timing circuit. With the timer 52 energized, a related capacitor 55 is charged and an SCR 56 along with the previously noted SCR 37 associated with the relay coil 38 are turned "on". A pnp transistor 57 in control relation with the gate of SCR 56 remains in an "off" condition. So long as the timer unit 52 remains "on", the SCR/diode unit 31 continues to provide the DC braking power to motor 10.

When the timer 52 reaches the end of its preset timing cycle, pin 3 thereof goes low in voltage. This serves to turn on a first diode portion 59 of a second opto-coupler 60 causing a second transistor portion 61 thereof to conduct. This shorts the drive to the gate of the SCR 45 associated with the SCR/diode unit 31 and stops its DC output to halt the flow of braking current to the motor 10.

At this time, the capacitor 55, which was charging during the "on" period for the timer unit 52, now discharges through a resistor 62 and pin 3 of the timer unit 52. The rate of discharge is selected to permit the stored motor energy to dissipate before the transistor 57 in circuit with the capacitor 55 turns "on". When the transistor 57 turns on, the gate of SCR 56 is shorted, de-energizing not only the SCR 56 but the SCR 37 and relay coil 38 at a point in time when the direct current output of unit 31 is no longer supplying current to motor 10. Thus, upon de-energization of the relay coil 38, opening of the relay contacts 41–44 occurs under substantially non-sparking conditions to disconnect the de-energized electronic motor brake from the AC power source lines L2 and L3.

De-energization of the relay coil 38 also re-establishes the normally closed contacts 18 which were open during the energized state of the relay thereby re-conditioning the motor starting and control circuit 15 for a re-starting operation.

Due to the utilization of the opto-couplers 34 and 60, it is possible, with the circuit above described, to connect and disconnect the electronic motor brake circuit to and from the motor and the AC source 14 over electromechanical relay contacts with substantially sparkless contact operation. It further is to be noted that action of the opto-coupler 34 is extremely fast, permitting connection of the electronic motor brake with the supply conductors L2 and L3 in a very short time interval, i.e., in the order of 25 miliseconds after the motor stop button 17 is activated. This quick reaction time permits an overall shorter motor stopping time so that sequential braking systems may be employed, such as the utilization of an electro-mechanical brake after the cessation of the dynamic braking cycle, but employing the brake control means of this invention.

From the foregoing, it is believed those of skill in the art will readily recognize and appreciate the novel advancement of the present invention over previously known systems for controlling electronic motor brakes, particularly for low integral and fractional horsepower motors, and will appreciate that while the present invention has been described above in association with a particular preferred circuit arrangement, the same is nevertheless susceptible to variation, modification and substitution of equivalents without departing from the spirit and scope thereof as defined in the following appended claims.

What is claimed is:

1. For use with integral and fractional low horsepower electric motors energized by an AC power supply, an AC powered electronic motor brake circuit including means for converting AC to DC for effecting dynamic braking of the motor, relay means for connecting and disconnecting said brake circuit with the AC power supply, and means for effecting substantially spark-free operation of said relay means comprising first control circuit means having a first opto-coupler means operably responsive to AC energy generated by the motor after disconnection thereof from said AC power supply to condition said relay means for contact closing operation and for preventing energization of said brake circuit until after contact closing operation of said relay means is completed, said contact closing operation serving to connect said brake circuit with said AC power supply; and additional control circuit means including second opto-coupler means operable to de-energize said relay means and disconnect the AC power supply therefrom after said brake circuit is de-energized.

2. The combination of claim 1 wherein said second control circuit means is operable to de-energize said brake circuit and relay means after a predetermined time interval.

3. The combination of claim 2, and timer means for determining said predetermined time interval and for controlling activation of said second opto-coupler means.

4. The combination of claim 1 wherein said first opto-coupler means is operable to permit contact closing operation of said relay means only in response to negative half-cycle energy output thereto from the motor.

5. The combination of claim 1 wherein said second opto-coupler means effectively de-energizes said brake circuit prior to de-energization of said relay means.

6. The combination of claim 4 wherein said first opto-coupler means is in circuit with a diode effective to block negative half-cycle energy generated by the motor whereby to prevent energization of said first opto-coupler means.

7. The combination of claim 4 wherein said relay means is in circuit with said first opto-coupler means, a capacitor, normally open motor contacts, and an SCR arranged so that discharge of said capacitor effects energization of the operating coil of said relay means when said first opto-coupler means is de-energized whereby to effect closing operation of relay contacts to establish connection of the brake circuit and said operating coil with said AC power source.

8. The combination of claim 7 wherein said brake circuit comprises a diode for preventing energization of a DC producing SCR thereof until after said relay contacts are closed.

9. The combination of claim 1 comprising timing means for regulating the length of time DC energy is applied to said motor, said relay means having movable contacts for connecting and disconnecting said brake circuit with the AC power supply, said first control circuit means including an operating coil of said relay means operably responsive to AC energy generated by said motor after its disconnection from said AC power source, and said additional control circuit means operable upon de-energization of said timing means to effect subsequent opening of said relay contacts.

* * * * *